Figure 2:
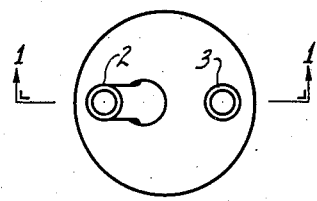

March 20, 1945.    D. C. HOLMES ET AL    2,371,995
VOLUMETER
Filed July 11, 1942    2 Sheets-Sheet 1

INVENTOR.
Donald C. Holmes
Lloyd V. Guild
BY William B. Jaspert
Attorney

Patented Mar. 20, 1945

2,371,995

UNITED STATES PATENT OFFICE 2,371,995

VOLUMETER

Donald C. Holmes, Blawnox, and Lloyd V. Guild, Pittsburgh, Pa., assignors to Burrell Technical Supply Company, Pittsburgh, Pa., a corporation of Pennsylvania Application July 11, 1942, Serial No. 450,580

5 Claims. (Cl. 73—194)

This invention relates to new and useful improvements in volumeters for measurement of gases, and it is among the objects thereof to provide a volumeter capable of maintaining substantially constant pressure.

In volumeters heretofore proposed, there is a common defect in their application to gas analysis problems involving small flows in that the progressive change of gas pressure during the cycle of operation results in sudden changes in the rate of gas flow.

The change in gas pressure is very objectionable in certain applications and it is a primary object of this invention to provide a volumeter in which the operating pressure and consequently the rate of gas flow will be substantially constant.

It is a further object of the invention to provide a volumeter employing a liquid seal which embodies a discharge chamber having a measuring chamber disposed therein with its bottom open and in communication with the discharge chamber, and with the discharge chamber of such area relative to the area of the measuring chamber that the displacement of the sealing liquid from the measuring chamber will produce a minor change in the level of the sealing liquid of the discharge chamber.

Still another object of the invention is the provision of a volumeter employing a bubbler tube disposed within the measuring chamber.

It is a further object of the invention to provide a volumeter having a U-tube establishing communication with the upper end of the measuring chamber and the discharge chamber, and it is a further object of the invention to so locate the bubbler tube with respect to the bight of the U-tube that the liquid level in the measuring chamber will be just below the bubbler outlet when the operation is about to occur.

Figure 3:
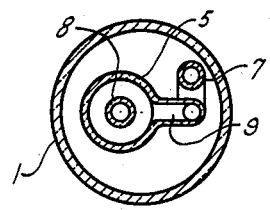
Figure 1:
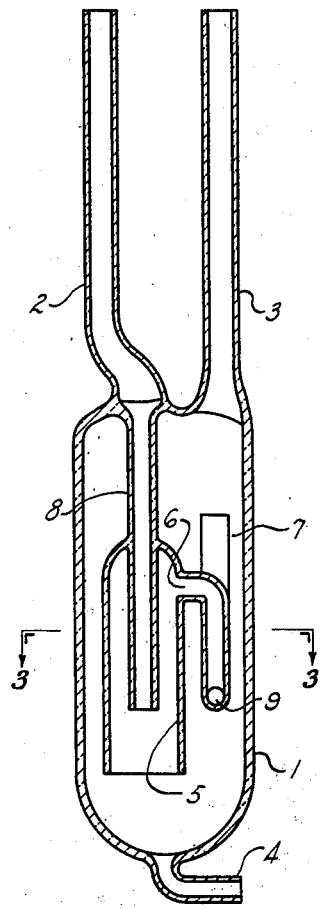
Figure 4:
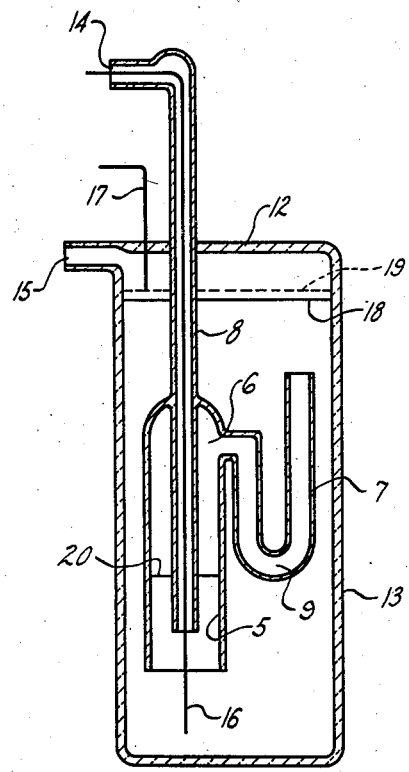
Figure 5:
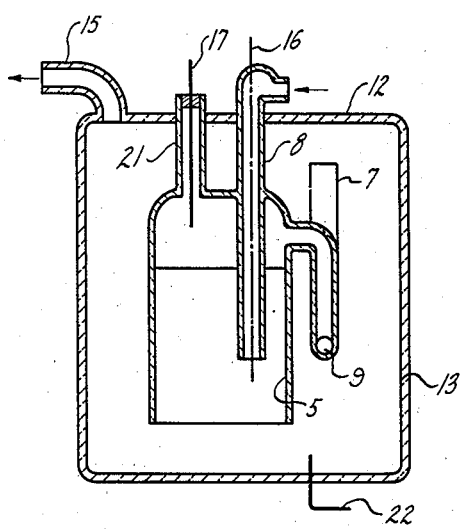
Figure 6:
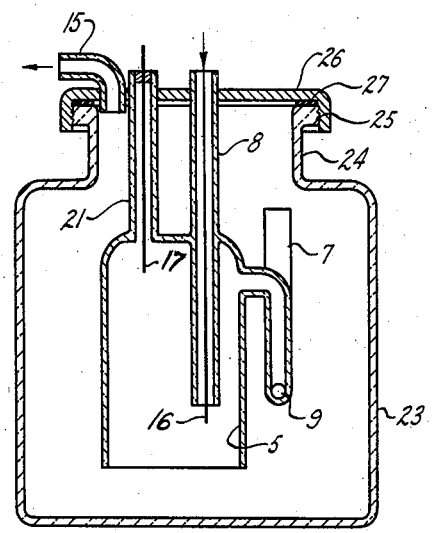

These and other objects of the invention will become more apparent from a consideration of the accompanying drawings constituting a part hereof in which like reference characters designate like parts and in which:

Fig. 1 is a vertical cross-sectional view of a volumeter embodying the principles of this invention taken along the line 1—1, Fig. 2;

Fig. 2 a top plan view thereof;

Fig. 3 a horizontal section taken along the line 3—3, Fig. 1;

Fig. 4 a vertical cross-sectional view of a modified form of the device;

Fig. 5 a diagrammatic view of still another modification of the volumeter;

Fig. 6 a similar view showing the volumeter including a sealed container; and

Figure 7:
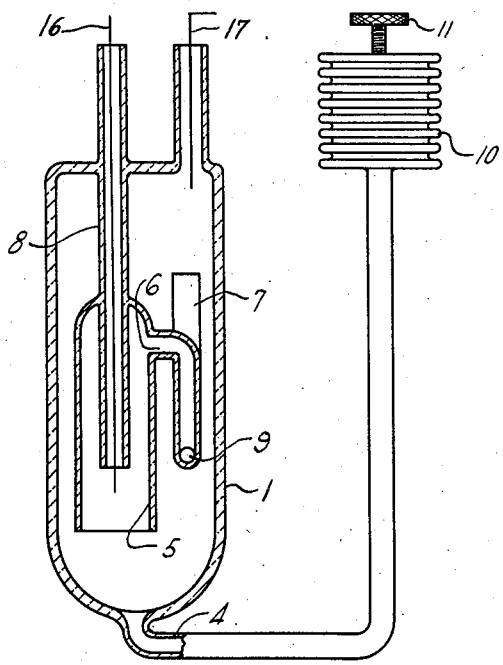

Fig. 7 a diagrammatic view illustrating the use of an adjustable means for varying the liquid level of the volumeter.

With reference to Figs. 1, 2 and 3 of the drawings, the structure therein illustrated comprises a glass container 1 having a gas inlet 2 and gas outlet 3; also a connection 4 at the bottom thereof for a source of sealing fluid.

The housing 1 may be referred to as a discharge chamber, 5 a measuring chamber having its upper portion connected at 6 to one leg of a U-tube 7, the measuring chamber being integrally joined with a bubbler tube 8 that extends into the measuring chamber 5 a distance corresponding to the bight 9 of the U-tube.

As shown in Fig. 7, the connection 4 communicates with a bellows 10 having an adjusting screw 11 and when the bellows and its connected tubing are full of water and the discharge chamber of the housing 1 is partially filled with a sealing liquid, the water level in the discharge chamber 1 may be regulated by turning the adjusting screw 11.

In the structure shown in Fig. 4, the measuring chamber 5 with its connected U-tube 7 is integrally formed with the bubbler tube 8 that extends through the top wall 12 of a housing 13, the gas inlet connection is at 14 and the discharge outlet at 15. In the several figures of the drawings numeral 16 designates an electrode, as does the numeral 17. Numeral 18 designates a normal level of the sealing liquid and the dotted line 19 the measuring level of the liquid, resulting from the displacement of the liquid from the measuring chamber 5. Electrodes 16 and 17 are connected in an electrical circuit, not shown, for energizing a recording device that will indicate the successive cycles of operation of the volumeter. The numeral 20 of Fig. 4 designates the level of the sealing liquid in the measuring chamber 5.

In the modification shown in Fig. 5, an extra tube 21 is provided for the electrode 17 and a permanent electrode 22 may be supplied through the base of the container 13 in place of the electrode 16.

In the structure shown in Fig. 6, a container 23 constituting the discharge chamber for containing the sealing liquid is provided with a neck 24 having a threaded surface 25 for receiving a screw cap 26; a sealing gasket 27 may be interposed by the cap and the container 23. A bubbler tube 8 extends through the cover 26 as does the discharge conduit 15 and the electrode conduit 21.

It will be noted that the discharge chambers of Figs. 5 and 6 are of relatively large diameter compared to the measuring chambers, so that such displacement of the sealing liquid from the measuring chamber as takes place from the pressure of the gas passing through the measuring chamber will vary the level of the sealing liquid in the discharge chamber but slightly.

The operation of the above-described volumeter is briefly as follows:

Referring to the device shown in Fig. 4 as typical, it will be noted that the end of the bubbler tube 8 extends below the bight 9 of the U-tube 7.

As appears from Fig. 4, the liquid level 20 is the minimum possible level in the measuring chamber because that level corresponds to the bight of the U-tube 7. Consequently, the end of the bubbler tube 8 will always be below the level 20.

Before any gas passes through the apparatus, the pressure in the bubbler tube 8 must be greater than the hydrostatic head from the normal water level 18 to the lower extremity of the bubbler tube. As the gas bubbles into the measuring chamber, the liquid is displaced from the bottom of the measuring chamber into the discharge chamber and will reach the level 19 to contact electrode 17 just as the liquid level in the measuring chamber 5 is in line with the bight 9 of the U-tube. When the liquid level of the measuring chamber 5 is just below the bight 9, the gas pressure will be sufficient to force the liquid from the U-tube 7, thus breaking the liquid seal and allowing a measured volume of gas to discharge into chamber 5. Thereafter the U-tube will immediately fill with the liquid from the discharge chamber forcing the gas out of U-tube 7 to restore the normal level of the liquid in the measuring chamber 5 and level 19 of the discharge chamber will drop to the level 18, thus breaking the contact with terminal 17 to complete the cycle.

The contact made through terminal 17 registers the given volume of the gas that has passed through the volumeter which corresponds to a predetermined constant volume of a liquid displaced in the measuring chamber.

The extension of the bubbler tube below the bight of the U-tube functions as follows: As the pressure in the measuring chamber 5 increases and displaces water into the discharge chamber, the pressure drop between the bottom of the tube 8 and the water level 20 decreases by an equal amount. Consequently, the total pressure in the bubbler tube 8 remains constant throughout the operating cycle except for the change in the water level 18 to position 19 caused by displacement of the water from the measuring chamber to the discharge chamber. By making the diameter of the discharge chamber larger as compared with that of the measuring chamber, the device may be made to operate at substantially constant inlet pressure throughout its cycle.

Where the lower extremity of the bubbler tube is on the same level as the bight 9 of the U-tube, as shown in Figs. 1, 5, 6 and 7, slightly larger variations in operating pressures will occur. The change in operating pressure due to rising water level in the discharge chamber is the same in both cases and can be made as small as desired by making the discharge chamber 1 larger in proportion to the measuring chamber.

Although several embodiments of the invention have been herein illustrated and described, it will be evident to those skilled in the art that various modifications may be made in the details of construction without departing from the principles herein set forth.

We claim:

1. A volumeter comprising a housing constituting a discharge chamber, said housing having a sealing liquid and having a gas inlet passage and a gas outlet passage, a measuring chamber disposed therein closed at one end and open at the other end to the discharge chamber, said measuring chamber having a U-tube communicating from the top of the measuring chamber through a wall thereof to the discharge chamber, the end of the U-tube terminating below the level of the liquid in the discharge chamber, a bubbler tube extending into said measuring chamber at least a distance level with the bight of the U-tube communicating with said inlet passage, a pair of electrodes for registering the displacement of the liquid from the measuring chamber in response to gas pressure developing in the measuring chamber, one of said electrodes extending to below the bight of U-tube and the other of said electrodes being above the bight of the U-tube whereby, the last-named electrode will be contacted by a rise of the sealing liquid in the discharge chamber.

2. A volumeter comprising a housing constituting a discharge chamber having a sealing liquid in a measuring chamber, said housing having a gas inlet passage and a gas outlet passage, a measuring chamber disposed therein communicating at one end with the inlet passage and open at the other end to the discharge chamber, said measuring chamber having a U-tube communicating from the top of the measuring chamber through a wall thereof to the discharge chamber the end of the U-tube terminating below the level of the liquid in the discharge chamber, a bubbler tube extending into said measuring chamber at least a distance below the bight of the U-tube communicating with said inlet passage, a pair of electrodes for registering the displacement of the liquid in said measuring chamber in response to gas pressure developing in the measuring chamber, one of said electrodes extending to below the bight of the U-tube and the other of said electrodes being above the bight of the U-tube whereby the last-named electrode will be contacted by a rise of the sealing liquid in the discharge chamber.

3. A volumeter comprising a housing for a sealing liquid constituting a discharge chamber, a measuring chamber disposed within the discharge chamber in the form of an inverted bell having an open bottom and a closed top, a gas outlet passage for the discharge chamber, and a gas inlet passage for the measuring chamber, a bubbler tube communicating with said inlet passage in said measuring chamber, a U-tube communicating with the top of the measuring chamber and having one leg extending below the liquid level in the discharge chamber, said bubbler tube terminating at the level of the bight of the U-tube, an electrode extending into said discharge chamber above the normal level of the sealing liquid and an electrode extending through a closed passage from a wall of the discharge chamber housing through the top of the measuring chamber.

4. A volumeter as described in claim 1 having a fluid supply passage connecting the discharge chamber to a source of sealing liquid, and adjustable means for delivering the sealing liquid to vary the level of the liquid in said discharge chamber.

5. A volumeter as set forth in claim 3 characterized by the sealing liquid housing having a movable wall to permit insertion of the measuring chamber therein.

DONALD C. HOLMES.
LLOYD V. GUILD.